United States Patent [19]

Call

[11] Patent Number: 4,543,836
[45] Date of Patent: Oct. 1, 1985

[54] MODULAR CUP-TYPE ANEMOMETER

[75] Inventor: David B. Call, Boulder, Colo.

[73] Assignee: Atmospheric Instrumentation Research, Inc., Boulder, Colo.

[21] Appl. No.: 546,733

[22] Filed: Oct. 28, 1983

[51] Int. Cl.[4] .............................................. G01F 1/05
[52] U.S. Cl. ............................. 73/861.85; 416/212 A
[58] Field of Search ............... 73/170 R, 189, 861.85; 416/212 R, 214, 212 A

[56] References Cited

U.S. PATENT DOCUMENTS

| | | | |
|---|---|---|---|
| 2,259,615 | 10/1941 | Chappell et al. | 73/189 |
| 3,020,963 | 2/1962 | Hakkarinen | 170/36 |
| 3,699,801 | 10/1972 | Jones | 73/189 |
| 3,850,546 | 11/1974 | Mason | 416/212 |
| 3,897,170 | 7/1975 | Darvishian | 416/119 |
| 4,102,188 | 7/1978 | Simerl | 73/170 |

Primary Examiner—Herbert Goldstein
Attorney, Agent, or Firm—John E. Reilly

[57] ABSTRACT

An anemometer for sensing shaft speed rotation includes a series of circumferentially spaced, radially extending arms and a corresponding series of wind cups, each disposed at an outer radial end of one of the arms. Each arm terminates at its inner end in a hub sector correspondingly formed as a portion of a central hub and correspondingly includes circumferentially extending, complementary offset portions and fasteners for releasably interlocking the offset portions of overlappingly to define the common central hub. The hub-connecting portion is mounted on the anemometer shaft by connector means.

14 Claims, 5 Drawing Figures

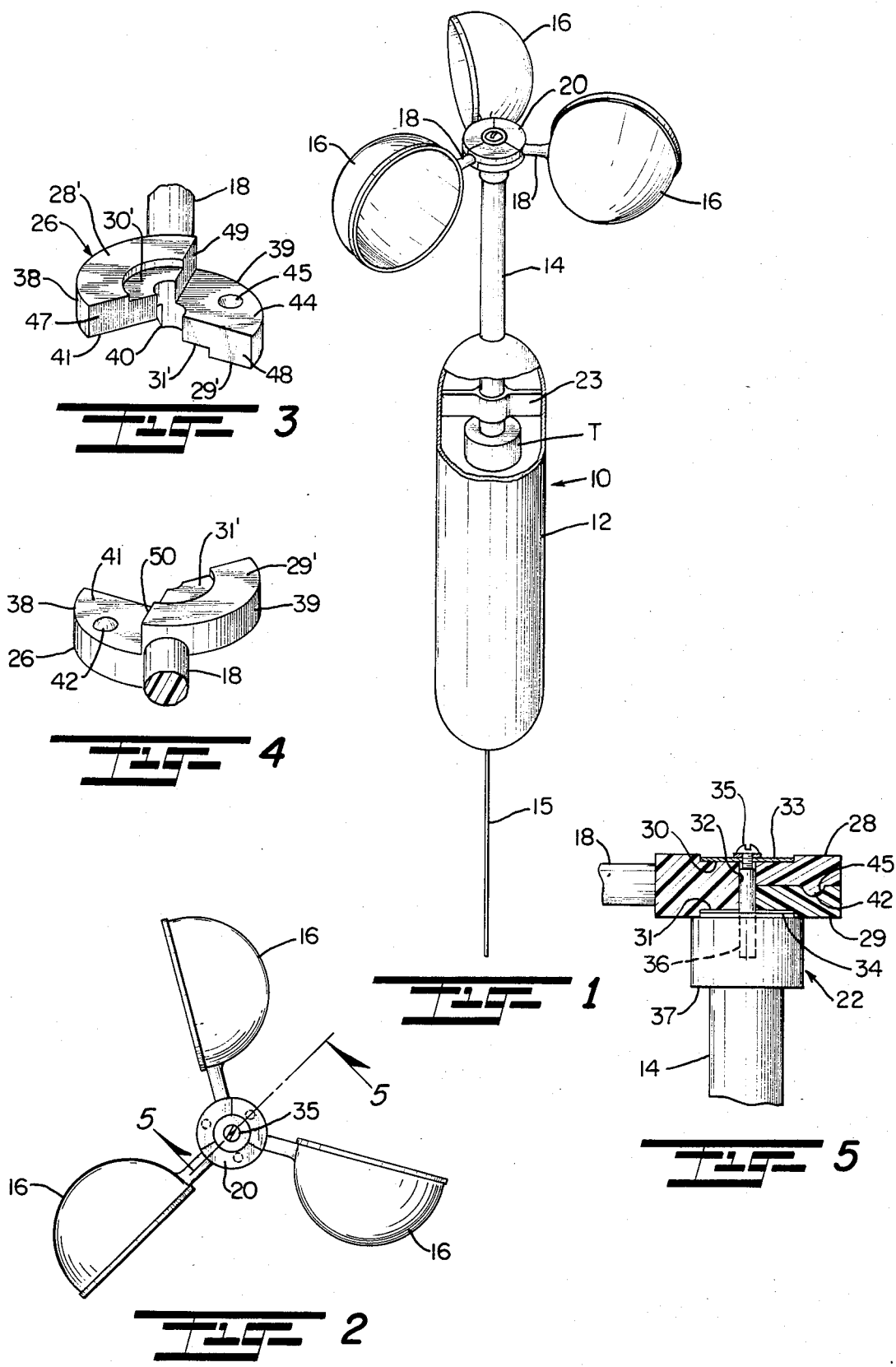

MODULAR CUP-TYPE ANEMOMETER

This invention relates to atmospheric testing and measuring devices and more particularly relates to a novel and improved portable anemometer of the type employing wind cups mounted on a common hub for the purpose of sensing wind velocity.

BACKGROUND AND FIELD OF THE INVENTION

In anemometers it is conventional practice to employ a rotor defined by a series of wind cups mounted on spokes which radiate from a common hub, the hub being secured to a shaft or spindle which projects from a sutiable airborne atmospheric testing device. Typically, the cups are so mounted that an axis through each cup is arranged perpendicular to the longitudinal axis of the hub, the cups being highly sensitive to air or wind speed so as to rotate at a rate corresponding to wind speed. This rotation is then transferred through the shaft into the sensing instrument and figured into various atmospheric calculations.

In the construction of the anemometer, it is highly desirable that the rotor possess perfect balance and alignment such that the cups are aligned in a common horizontal plane and can be simply fabricated, such as, by molding. However, molding a series of cups and connected spokes with a common hub can be quite expensive and time-consuming. Moreover, if one of the cups or the connected spokes should become broken it would require replacement of the entire assembly. In the past, rotor assemblies have been devised in which the cups are formed unitarily with spokes, the spokes being pivotally connected by links to a spider plate, such as, disclosed by U.S. Pat. No. 4,102,188 to R. A. Simerl. Another approach to rotor construction is illustrated in U.S. Pat. No. 3,020,963 to W. Hakkarinen in which each cup has a securing band riveted to an arm of a spider plate with the entire structure reinforced by one or more rigid rings secured above and below the cup. U.S. Pat. No. 3,897,170 to A. Darvishian discloses a wind motor construction for conversion of wind power to other usable forms of power wherein cups are pivotally mounted on arms fastened by collars to a central shaft. However, the cups are arranged to rotate in different horizontal planes which is not practical for use in an anemometer assembly where, among other criteria, it is important that there be optimum balance and alignment of the cups in a common plane. Representative of other approaches in the construction of anemometer devices are U.S. Pat. No. 3,699,801 to J. I. P. Jones and U.S. Pat. No. 2,259,615 to R. R. Chappell et al.

SUMMARY OF THE INVENTION

It is therefore an object of the present invention to provide for a novel and improved anemometer possessing optimum balance and alignment of a series of wind cups in a common horizontal plane for rotation about a common axis.

Another object of the present invention is to provide for a novel and improved method and means for modular construction of a series of wind cups for an anemometer which is lightweight but rugged.

It is a further object of the present invention to provide for a novel and improved rotor assembly in which individual wind cups and connected spokes may be replaced in the event of damage without affecting their performance or requiring recalibration of the assembly.

In accordance with the present invention, there has been devised for an anemometer having means for sensing shaft speed rotation a series of circumferentially spaced, radially extending arms together with a corresponding series of wind cups, each of which is disposed at an outer radial end of one of the arms. Each arm terminates at its inner end in a hub sector and each hub sector is correspondingly formed to constitute a portion of a central hub. Each sector correspondingly includes circumferentially extending, complementary offset portions and fasteners for releasably interlocking the offset portions of one hub sector into overlapping relation to the offset portions of the next adjacent hub sectors thereby defining the common central hub. Connector means mount the hub on a hub-connecting portion of the anemometer shaft.

In a preferred form, a cup-type anemometer is comprised of an integrally molded cup, spoke and hub sector, each hub sector having complementary projections and socket portions for interlocking engagement of adjacent hub sectors so that the cups are arranged to rotate in a common plane. Preferably a series of three cups are arranged at equal 120° intervals, each hub sector for a cup forming one-third of the assembled hub, and the assembled hub provided with a central opening to facilitate mounting of the hub on a central shaft of an atmospheric testing device so that wind speed can be measured via the speed of rotation of the shaft in a well-known manner.

The above and other objects, advantages and features of the present invention will become more readily appreciated and understood when taken together with the following detailed description of a preferred embodiment of the present invention in conjunction with the accompanying drawings, in which:

BRIEF DESCRIPTION OF THE DRAWINGS

FIG. 1 is a perspective view of a preferred form of anemometer in accordance with the present invention;

FIG. 2 is a top plan view of the anemometer shown in FIG. 1;

FIG. 3 is an enlarged perspective view in detail showing a preferred form of hub sector forming a part of the anemometer of the present invention;

FIG. 4 is another perspective view of the hub sector of FIG. 3 and illustrating the reverse or underside thereof; and FIG. 5 is a view partially in section taken about lines 5—5 of FIG. 2 illustrating the mounting of a cup assembly to the upper end of a rotor in the preferred embodiment of the present invention.

DETAILED DESCRIPTION OF THE PREFERRED EMBODIMENT

Referring in more detail to the drawings, there is shown by way of illustrative example in FIG. 1 an atmospheric sounding probe 10 which is conventionally of the type intended for use on tethered balloons and kites. For instance, the sounding probe may be a TS-3A-SP Tethersonde, manufactured and sold by A.I.R., Inc. of Boulder, Colo. "Tethersonde" being a registered trademark of A.I.R., Inc. The sounding probe typically is suspended from a helium- or hydrogen-filled balloon wherein static lift produced by the gas will carry the balloon to a height of one KM in light winds. The probe measures temperature, humidity, pressure, wind speed and wind direction through sensing instruments contained within a central elongated oval-shaped housing 12, the sensing instruments including a light chopper tachometer represented at T for the purpose of measuring speed of rotation of a longitudinally extending shaft 14 journaled within the sensor housing 12 in a manner to be described. The shaft is caused to rotate by means of the cup-type anemometer consisting of a series of three hemispherical wind cups 16, each cup mounted on a radially extending arm or spoke 18 from a central hub 20 keyed to an upper hub-connecting end portion 22 at the upper or distal end of the shaft. Here, the lower end of the shaft is mounted in precision-sealed bearings 23 above the light chopper tachometer T so as to enable excellent sensitivity at extremely low starting speeds. Although not shown, a magnetic compass positioned beneath the light chopper serves to measure wind direction where, for example, direction is detected with a circular potentiometer whose wiper is oriented to magnetic North by two small bar magnets. An antenna 15 projects from the lower end of the housing 12.

In accordance with the present invention, the wind cup assembly comprising the wind cups 16, radially extending arms 18 and central hub 20 are designed and constructed so as to be extremely light in weight with perfect balance and alignment with respect to the shaft. Further, being of the portable type and subject to extremes in weather conditions, individual parts of the assembly and particularly the arms and cups are subject to damage and consequent replacement. Accordingly, in order to permit replacement of individual arms and cups while maintaining the desired balance and alignment with necessity of calibration each time that a replacement is required, each cup 16 and arm 18 is formed as a unitary sub-assembly with a hub sector 26 of the hub 20.

Preliminary to a more detailed consideration of the preferred form of hub sector construction, it will be seen by reference to FIG. 5, that the hub sectors are assembled into a common annular hub 20 having opposed upper and lower surfaces 28 and 29 provided with shallow circular depressions 30 and 31 in surrounding relation to a central sleeve 32. Connecting means for the assembled hub are defined by a washer 33 seated in the depression 30 and which serves to sandwich the hub sectors 26 together upon insertion of a mounting screw 35 through the internally threaded sleeve 32, the sleeve being mounted in a counterbore 36 in the upper end of end cap 37 and fixed for rotation with the central shaft 14. The lower depression 31 is seated on a raised portion 34 of the end cap 37.

In the preferred form, a series of three wind cups 16 are illustrated each at the end of a unitary arm 18 and hub sector 26, the hub sectors 26 correspondingly formed to make up equal thirds of the assembled hub 20 for the purpose of arranging the wind cups at equally spaced circumferential intervals, or 120° apart, around the central shaft 14. To this end, each hub sector 26 is comprised of a pair of upper and lower offset portions 38 and 39 disposed in spaced, parallel relation to one another and joined in partially overlapping relation by a common web portion 40. The upper offset portion 38 has an upper surface 28' which forms part of the upper surface 28 of the assembled hub 20 including a depressed surface 30' which forms a part of the annular recessed surface or depression 30 of the assembled hub. The underside of the upper offset portion is similarly in the form of a flat surface 41 having a rounded protrusion 42, as best seen from FIG. 5. In turn, each lower offset portion 39 has a lower surface portion 29' with an annular depression 31' making up sections of the lower surface 29 and its depressed area 31. The upper surface 44 of the lower offset portion is provided with a centrally located opening or counterbore 45 aligned to receive one of the rounded protrusions 42 on the next adjacent hub sector when the sectors are assembled together. It will be noted that each upper surface 44 of a sector 26 is disposed in a common plane with the undersurface 41, each of the offset portions terminating in vertical end surfaces 47 and 48 at opposite free ends and overlapping vertical end surfaces 49 and 50. In this manner, the outer end surfaces 47 and 48 will move into flush abutting relation to corresponding end surfaces of an adjacent hub sector and the same is true of the overlapping end surfaces 49 and 50 when the complementary protrusions 42 and openings 45 are aligned with one another so as to releasably interlock the hub sectors together.

The unitary cup 16, arm 18 and hub 20 are preferably formed as a one-piece molding each being of corresponding size and configuration throughout. In order to assemble onto the end of the shaft, the hub sectors are aligned in the manner described and placed on top of the end cap 37 with the annular depression 31 aligned over the raised portion of the end cap 37. The screw 35 is then threaded into the sleeve 32 until the washer 33 bears firmly against the annular depression 30. Once joined in the manner described, the complementary protrusions 42 and openings 45 will securely lock the hub sectors together and prevent any shifting or radial displacement. In the event of damage to any one of the cup members or arms in use, it is necessary merely to loosen the screw 35, remove the damaged cup sub-assembly and replace with a new cup sub-assembly corresponding to the other cup sub-assemblies without in any way affecting the calibration or operation of the unit.

It will be evident from the foregoing that while the preferred form of invention has been described employing three cup sub-assemblies at equally spaced 120° intervals, the aggregate number may be modified as well as their exact angular disposition. In this respect, however, it is preferred in utilization as an anemometer to arrange the cup members with their axes aligned normal to the longitudinal axes of their respective arms; also, to align the cup members in a common horizontal plane as opposed to offsetting or staggering. A particular and notable advantage of the present invention is that it enables disposition of the cup members 16 in a common plane notwithstanding their interconnection through the offset portions of the hub sectors. Further, while the preferred form of invention has been described with the protuberances or projections 42 on the undersurfaces of the hub sector, it will be apparent that the hub sector mounting may be reversed; or, in other words, each flipped over with the projection-receiving openings on the undersurfaces to receive the projections on the upper surfaces. Similarly, it will be appreciated that by virtue of the symmetrical configuration of the top and bottom surfaces of the hub it can be reversibly mounted with respect to the shaft depending upon which direction the wind cups are to rotate. Moreover, notwithstanding the modular construction of the assembly and the ease of interfitting sub-assemblies together, the complementary relationship established between the interlocking portions between the offset portions will assure that the wind cups face in the same direction when assembled.

It is therefore to be understood from the foregoing that various modifications and changes may be made in the construction and arrangement of parts as well as their method of fabrication without departing from the spirit and scope of the present invention as defined by the appended claims.

I claim:

1. In an anemometer having means for sensing shaft speed rotation and rotatable shaft means extending from said sensing means and provided with a distal hub-connecting portion, the improvement comprising:

a series of circumferentially spaced, radially extending arms, a corresponding series of cup members, each said cup member disposed at an outer radial end of one of said arms, each arm terminating at its inner end in a hub sector, each said hub sector correspondingly formed to define a portion of a central hub, each said sector correspondingly including circumferentially extending, complementary offset portions, fastener means releasably interlocking said offset portions of one hub sector into overlapping relation to offset portions of next-adjacent hub sectors whereby to define said common central hub, and connecting means mounting said hub on said hub-connecting portion of said shaft means.

2. In an anemometer according to claim 1, each said hub sector defined by a pair of circumferentially extending, offset portions disposed in different horizontal planes, said fastening means releasably interlocking said offset portions such that said arms are disposed in a common plane.

3. In an anemometer according to claim 1, said fastening means defined by complementary projections and openings between overlapping offset portions of said adjacent hub sector.

4. In an anemometer according to claim 1, each said hub sector having generally planar, circumferentially extending offset portions of a thickness less than the thickness of said hub, each arm projecting radially from a midpoint between said planar offset portions.

5. In an anemometer according to claim 1, each said cup member being in the form of a hemispherical shell disposed on an axis normal to the longitudinal axis of each associated arm.

6. In an anemometer according to claim 1, each said cup member, arm and hub sector being of one-piece construction.

7. In an anemometer having sensor means for sensing shaft speed rotation and rotatable shaft means extending from said sensor means and terminating in a distal hub-connecting end portion, the improvement comprising:

a series of circumferentially spaced, radially extending arms, a corresponding series of wind cup members, each said cup member disposed at an outer radial end of one of said arms, each arm terminating at its inner end in a hub sector, each said sector correspondingly including circumferentially extending, complementary upper and lower offset portions, fastener means releasably interlocking said offset portions of one hub sector into overlapping relation to offset portions of next-adjacent hub sectors whereby to define said common central hub, and connecting means mounting said hub on said hub-connecting end portion of said shaft means.

8. In an anemometer according to claim 7, said fastening means defined by complementary projections and openings between overlapping offset portions of said adjacent hub sector.

9. In an anemometer according to claim 7, each said hub sector having generally flat, circumferentially extending offset portions of a thickness less than the thickness of said hub, each arm projecting radially from a midpoint between said planar offset portions.

10. In a portable atmospheric sounding probe in which a sensor housing is provided with atmospheric sensing instruments including a tachometer for sensing wind speed via a shaft journaled for rotation in said sensor housing with one end of said shaft projecting from said housing, the improvement comprising:

a wind cup assembly comprising a series of hemispherical wind cups, a hub sector for each wind cup including means mounting each said wind cup for outward radial extension from an associated hub sector, each hub sector including interlocking portions engageable with complementary interlocking portions of adjacent hub sectors, connecting means releasably securing said interlocking portions of said adjacent hub sectors together so as to define a common annular hub, and said connecting means further mounting said hub on said one end of said shaft with said wind cups extending radially in a common plane from said hub.

11. In a portable atmospheric sounding probe according to claim 10, said wind cups having concavo-convex surface portions facing in a common direction.

12. In a portable atmospheric sounding probe according to claim 10, said hub being an annular hub provided with a central opening, and said connecting means being in the form of a threaded stem projecting through said central opening of said hub for threaded connection to said shaft.

13. In a portable atmospheric sounding probe according to claim 12, including a sleeve fixed for rotation with said shaft, an end cap in surrounding relation to said shaft at a terminal end of said shaft, said sleeve received in an upper end portion of said cap, said sleeve provided with a threaded opening for threaded interconnection of said connecting means to said shaft.

14. In a portable atmospheric sounding probe according to claim 10, wherein said sectors are provided with offset portions having interlocking surface portions thereon.

* * * * *

UNITED STATES PATENT AND TRADEMARK OFFICE
CERTIFICATE OF CORRECTION

PATENT NO. : 4,543,836
DATED : 1 October, 1985
INVENTOR(S) : Call, David B.

It is certified that error appears in the above—identified patent and that said Letters Patent is hereby corrected as shown below:

In the Abstract, line 9, after "of", insert -- one hub sector --.

Column 1, line 16, cancel "sutiable" and substitute -- suitable --.

Signed and Sealed this

Eleventh Day of February 1986

[SEAL]

Attest:

DONALD J. QUIGG

Attesting Officer

Commissioner of Patents and Trademarks